Figure 1:
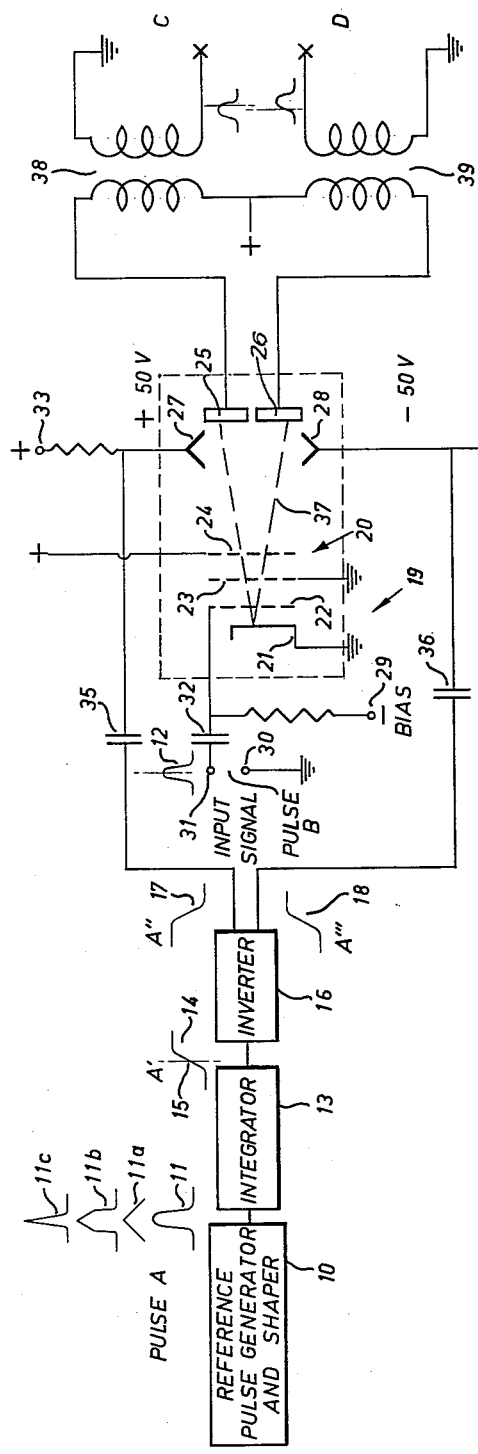

Nov. 13, 1962 G. L. HOBROUGH 3,064,198
PULSE TIME DISCRIMINATING SYSTEM USING
SWITCHED DUAL ANODE BEAM TUBE
Filed Nov. 30, 1956 2 Sheets-Sheet 1

*Inventor*
GILBERT L. HOBROUGH
by: *J. Richard Cavanaugh*

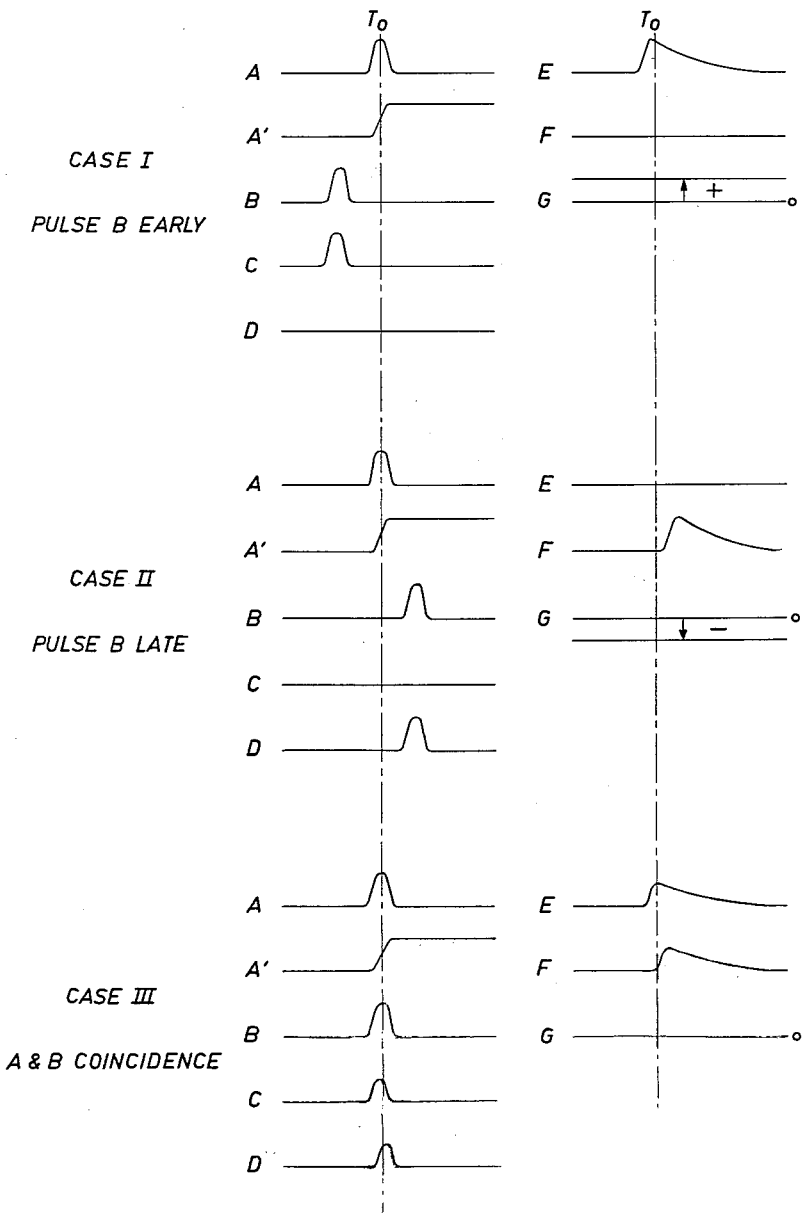

United States Patent Office 3,064,198
Patented Nov. 13, 1962

3,064,198
PULSE TIME DISCRIMINATING SYSTEM USING SWITCHED DUAL ANODE BEAM TUBE
Gilbert Louis Hobrough, Oshawa, Ontario, Canada, assignor, by mesne assignments, to Hunting Survey Corporation Limited, Toronto, Ontario, Canada
Filed Nov. 30, 1956, Ser. No. 625,353
2 Claims. (Cl. 328—109)

This invention relates to a pulse time discriminating system and to a method of continuously comparing two series of pulses with respect to coincidence thereof in point of time.

In radar circuitry and the like, a measure of the degree of synchronization of a series of generated pulses substantially equally spaced in time with another series of pulses, may be desired. Circuitry has been utilized in the past for processing pulses having a reference leading edge. In known circuitry, two multigrid electronic valves or tubes are sequentially supplied with gating pulses usually on the screen grids thereof, i.e., the tubes are rendered sequentially conducting. The gating pulses for each tube are provided at a reference time interval with which the signal pulses are to be compared. The control grids are supplied commonly with the signal pulse to be discriminated. In such methods, the trailing edge of a first gating pulse is coincident in time with the leading edge of the following gating pulse so that the signal pulse is discriminated with respect to the second gate pulse leading edge instant of time. However, since the tubes are normally insensitive, i.e., they are conducting only during the intervals of their respective gate pulses, signal pulses following outside of the gate period during a non-conducting interval, are not sensed, seen or discriminated.

This disadvantage of prior coincidence discriminators has been overcome heretofore only by the addition of complex signal searching or seeking circuitry which causes the gating pulses to sweep back and forth in time until the sought signal pulse is located.

This invention seeks to avoid the complexity of prior coincidence discriminators and methods by providing a continuously sensitive pulse time comparing system in which signals arriving before the reference time are sharply differentiated from those arriving after the reference time.

It is a further object of the invention to provide a pulse time discriminator and method especially suited for the handling of center reference pulses.

It is a still further object of the invention to provide a pulse time discriminator and method for center reference pulses of substantially Gaussian form.

The invention generally utilizes a dual target electron beam tube effectively as a dual channel amplifier in which the proportionally amplified input signal pulses are obtainable from the anodes from which a dual channel output may be obtained. The reference signal pulses are applied effectively as a sweep signal to the deflecting plates of the tube in such a manner that for exact signal coincidence, each of the amplifier channels amplifies the input signal equally. Accordingly, the amplification of each of the channels of the dual channel amplifier is changed proportionally responsive to the reference signal pulses. The differential rectification of the amplified signals obtained from the target anodes, that is, from both of the amplifier channels, provides a direct current signal of zero value at coincidence but of positive or negative going proportional values responsive to a positive or negative time difference or interval during a condition of lack of coincidence in time in said pulses.

Other objects of the invention will be appreciated by a study of the following specification taken in conjunction with the accompanying drawings.

Figure 2:
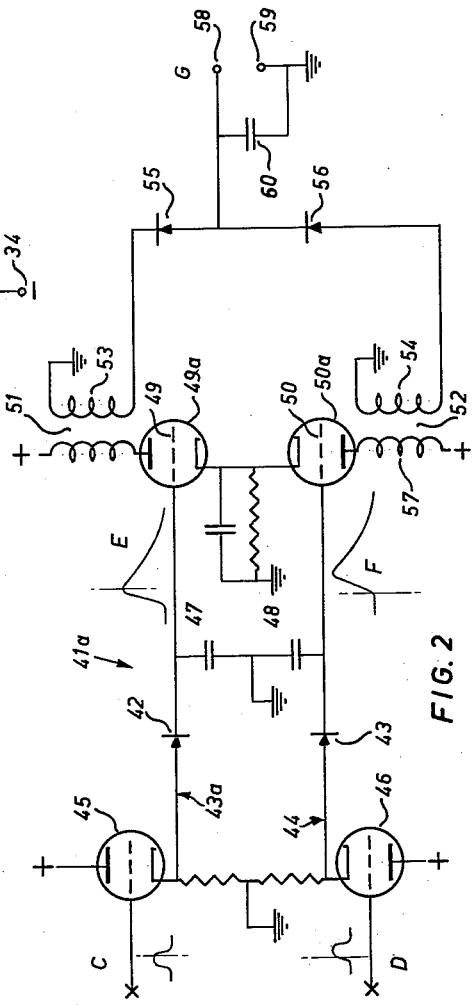

In the drawings:
FIGURE 1 is an electrical schematic of a pulse delay discriminator according to the invention revealing the utilization therein of a split or dual target electron beam tube of the electrostatic deflection type;
FIGURE 2 shows an electrical schematic of pulse processing circuitry of the invention adapted to convert the output of the discriminator of FIGURE 1 to a single usable signal responsive to a lack of pulse time coincidence; and
FIGURE 3 is a wave form chart showing the wave forms at identified points of FIGURES 1 and 2 for early, late and coincident pulses.

Referring to the drawings, a conventional reference pulse generator and shaper 10 provides reference pulses 11 at A. The signal pulses 12 to be discriminated and shown at B are preferably of a center reference type and preferably of Gaussian form though the system and method disclosed herein is adaptable to the handling of other pulse forms of the prior art. If it be desired by way of example to discriminate the signal pulse 12 against a series of reference pulses having a fixed or uniform time base, then reference pulses 11 of substantially corresponding wave form should be provided by the generator and shaper 10 although in many cases sufficient accuracy of discrimination may be afforded by using a different shape of reference pulse such as any of the reference pulses 11a, 11b, 11c or other center reference type of uniform shape. Regardless, the reference pulse should be of such form at A' after passing through the integrator 12 or other shaping device, that the wave form 14 embodies a steep sloped portion 15, the center of which corresponds to the peak point of a pulse 11. A conventional inverter device 16 passes the signal A' to provide the opposed signals A", A''' as indicated at 17 and 18.

The discriminator of the invention embodies a so-called "beam deflection electron tube" 19 comprising a gun structure 20 having a cathode 21 adapted to emit an electron stream in the direction of the control grid 22 focusing electrode 23, and accelerating electrode 24 whereby the cathode emission is directed as an electron beam or sheet toward the dual target plates or anodes 25 and 26. The electrostatic deflection plates 27 and 28 are adapted to deflect the electron beam toward one or other of the targets in accordance with electrostatic potentials applied thereto. A so-called "beam deflection tube" of this general type is obtainable on the North American continent at this time under the generally accepted designation 6AR8. Other so-called target tubes similar in function to a cathode ray tube having dual target anodes in the place of the screen may also be employed. The control grid 22 is normally biased to cut off by a suitable biasing source applied to terminal 29. Accordingly, a pulse 12 applied to the signal input terminals 30 and 31 passes through condenser 32 to be applied to the grid 22 in a positive direction to release the electron stream from cathode 21 as a pulse of electrons toward the target anodes 25 and 26. The electrostatic deflection plates are initially biased by suitable biasing sources applied to the terminals 33 and 34 such that one deflection plate is biased positive and the other negative, to provide deflection of the electron stream to one of the target anodes. At a time instant $T_0$ with respect to which the signal pulse 12 is to be discriminated, the electrostatic potentials on the deflection plates are reversed by reference signals at 17 and 18 applied thereto through the condensers 35 and 36 so that thereafter the electron stream will be directed toward the other target anode. For example, signal pulses occurring before the reference time instant $T_0$ will cause current pulses, say in anode 25 and a signal pulse after $T_0$ will cause a current pulse in the anode 26. Where the signal pulses occur at $T_0$ then the electron beam or pulse stream 37 will strike both anodes substantially equally so that the same plate current will be obtained from each anode.

The subsequent circuitry of the discriminator of the invention set forth in the remainder of the drawings, stretches and amplifies the current pulses thus obtained from the anodes 25 and 26 and applies a differential rectification providing a direct current output signal, the polarity of which is adapted to indicate the position in time or on a time reference base, of the signal pulse with respect to the reference time instant $T_0$.

If the signal pulse is coincident with $T_0$ the direct current signal will be zero. These subsequent functions are achieved by passing the current pulses from the anodes 25 and 26 through the primaries of transformers 38 and 39 respectively to provide a dual channel output from the secondaries of the transformers, in the form of positive going voltage pulses. For convenience, the pulses A, A' and B are shown as well as those at C and D for cases I, II and III on the chart of FIGURE 3.

The pulse shaping and rectifying circuit 41a shown in FIGURE 2 embodies a series rectifier or diode device 42 and 43 in each channel 43a and 44 respectively adapted to pass the leading edge of the pulse up to the peak value thereof. Suitable coupling and impedance match is provided by the cathode follower coupling tubes 45 and 46 in conventional connection. The condensers 47 and 48 effectively stretch the pulse width by providing a suitable decay period from peak pulse potential on its corresponding diode device. By this means following power amplification can be effected with longer duty cycles and therefore at less severe currents.

The stretched pulses at E and F are applied to grids 49 and 50 of the triode power amplifier tubes 49a and 50a. Output transformers 51 and 52 of the power amplifier section of circuit 41a have their secondaries 53 and 54 connected through the series rectifying means 55 and 56 in such manner that one of the secondaries, (i.e. 56) is in reverse connection with respect to its primary 57 whereby a uni-directional direct current output may be obtained across terminals 58 and 59 from between rectifying means 55 and 56. The condenser 60 serves to smooth the direct current output by by-passing any ripple components to ground.

In operation, the wave forms for the different cases at points E and F as shown in FIGURE 2 result in a direct current signal at G which may be positive when the signal pulse arrives in advance of $T_0$ and negative when the signal pulses arrives after $T_0$. The direct current signal will be zero when the signal pulse arrives at $T_0$.

It will be observed that the reference pulses 17 and 18 define $T_0$ at the center of their wave forms on the steep portions thereof. In a diagrammatic sense, the cross-over of these wave forms defines $T_0$. If the signal pulse arrives before or after the cross-over point of these wave forms during their influence on the potentials applied to the electrostatic deflecting plates 27 and 28, the signal pulse will be arriving at a time when the beam is deflected by these reference pulses to one or the other of the target anodes 25 and 26. It is preferred that the reference portion 15 of the shaped reference pulse 14 at A' be as steep as possible to enable a precise determination of $T_0$ as set forth.

What I claim is:
1. A signal pulse time discriminator comprising in combination: a dual channel amplifier in the form of an electron tube having an electron beam forming gun structure including a control electrode and a pair of target anodes disposed substantially in side by side relationship in the path of said electron beam in said tube, each anode being of a size adapted to accept substantially the entire electron energy of said beam upon being struck thereby and effectively forming one channel of said amplifier; means providing a corresponding reference signal pulse for a signal pulse; means responsive to said reference signal pulse for deflecting said electron beam to effect sweeping of said target anodes thereby from one anode to the other; means for applying a signal pulse to said control electrode; means biasing said control electrode normally beyond cut-off to release electron beam energy responsive to a signal pulse thereon providing substantially proportional energization of said target anodes responsive to the time interval between said signal pulse and the corresponding reference signal pulse therefor; and means for differentially rectifying the proportionally amplified signal pulse obtainable from said target anodes to provide a direct current signal of a value proportional to the time interval between said signal pulse and said corresponding reference signal pulse.

2. A centre reference signal pulse time discriminator comprising in combination: a dual channel amplifier in the form of an electron tube having an electron beam forming gun structure including a control electrode and a pair of target anodes disposed substantially in side by side relationship in the path of said electron beam in said tube, each anode being of a size adapted to accept substantially the entire electron energy of said beam upon being struck thereby and effectively forming one channel of said amplifier; means providing a corresponding reference signal pulse for a signal pulse; means responsive to said reference signal pulse for deflecting said electron beam to effect sweeping of said target anodes thereby from one anode to the other; means for applying a signal pulse to said control electrode; means biasing said control electrode normally beyond cut-off to release electron beam energy responsive to a signal pulse thereon providing substantially proportional energization of said target anodes responsive to the time interval between said signal pulse and the corresponding reference signal pulse therefor; means for each of said target anodes for increasing the duration of the amplified signal pulse obtainable therefrom; and means for differentially rectifying the amplified signal pulse of increased duration to provide a direct current signal of a value proportional to the lack of coincidence in the time of said signal pulse and said reference pulse.

References Cited in the file of this patent

UNITED STATES PATENTS

| | | |
|---|---|---|
| 2,024,979 | Metcalf | Dec. 17, 1935 |
| 2,262,406 | Rath | Nov. 11, 1941 |
| 2,262,407 | Rath | Nov. 11, 1941 |
| 2,460,690 | Glass | Feb. 1, 1949 |
| 2,508,384 | Gross | May 23, 1950 |
| 2,559,606 | Dubin | July 10, 1951 |
| 2,662,113 | Schouten et al. | Dec. 8, 1953 |
| 2,696,566 | Lion et al. | Dec. 7, 1954 |
| 2,751,555 | Kirkpatrick | June 19, 1956 |
| 2,758,153 | Alder | Aug. 7, 1956 |
| 2,780,724 | Fickett | Feb. 5, 1957 |
| 2,834,879 | Bauman | May 13, 1958 |
| 2,934,598 | Richman | Apr. 26, 1960 |